United States Patent Office 3,227,144
Patented Jan. 4, 1966

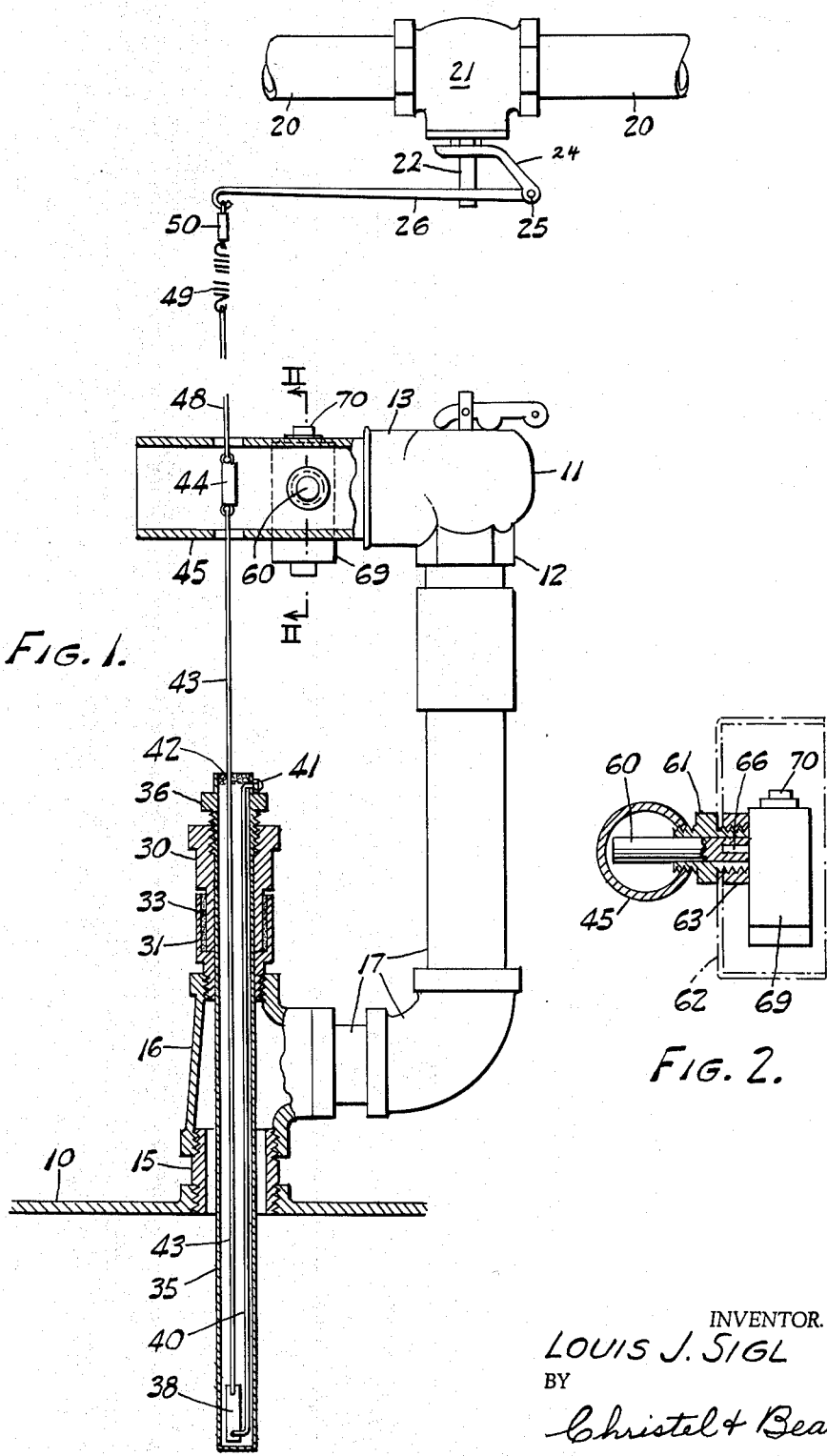

3,227,144
SAFETY CONTROL MEANS FOR HEATING
APPARATUS
Louis J. Sigl, 1088 Colvin Ave., Kenmore, N.Y.
Filed Dec. 4, 1963, Ser. No. 328,007
8 Claims. (Cl. 122—504.1)

This invention relates to safety devices for boilers or other apparatus subject to heat and pressure and more particularly to a safety system adapted to shut off the fuel supply to such apparatus upon the occurrence of any one of various contingencies or abnormal conditions.

It is common to employ a conventional safety valve in heating apparatus of the present type but the safety valve may fail to open at the indicated pressure or it may inadvertently be set for too high a pressure. Furthermore, as will appear more fully later herein, the heating apparatus may be subjected to various abnormal conditions which are not directly reflected in excessive pressure at the safety valve. Furthermore, conventional safety valves open to relieve excessive pressures and automatically reclose when, due to this relief or otherwise, pressures go back to normal or to a pressure below the safety valve setting.

The present invention provides a safety system wherein, upon the occurrence of any one of several thermal abnormalities, the fuel supply is cut off and is not resumed until personal attention is given to the safety system. This tends to insure the elimination of the condition which caused the abnormal temperature before operation is resumed.

Speaking generally, the present safety system provides a tension rod or a tension rod system which normally holds a fuel supply valve or the like in open position, the valve being otherwise yieldably biased to closed position. This rod system contains a series of fusible elements, the failure of any one of which due to an abnormal thermal condition adjacent thereto causes the tension force of the rod system to be interrupted, whereupon the fuel supply valve or analogous control member automatically operates to cut off the supply of fuel to the apparatus with which the present safety system is associated.

Further control means, operating electrically, is subject to abnormal temperature caused by opening of the safety valve and is effective to control electrical devices such as switches, solenoid valves, and the like whenever the safety valve opens under excessive pressure.

A more detailed understanding of the objects and advantages of the present invention will be had from a study of the exemplary embodiment thereof shown in the accompanying drawing and described in detail in the following specification. However, it is to be understood that the present invention is not limited to the form of the invention thus shown for illustrative purposes, nor otherwise than as defined in the appended claims.

In the drawing:

FIG. 1 is a vertical longitudinal cross-sectional view through one form of the novel safety arrangement of the present invention showing a safety valve mounted upon a boiler or similar apparatus and a fuel control valve in association therewith, the illustration being to some extent schematic; and FIG. 2 is a cross sectional view taken approximately on the line II—II of FIG. 1.

In the drawing, referring particularly to FIG. 1, the numeral 10 designates a steam or hot water boiler or similar apparatus and the numeral 11 designates a safety valve having an inlet 12 and an outlet 13. In the illustrated instance the inlet 12 of the safety valve is connected with boiler 10 by a nipple 15, a tee 16, and further piping 17.

In FIG. 1 the numeral 20 designates a fuel supply line which may supply gas or fuel oil to the burner which fires boiler 10. The numeral 21 designates a control valve interposed in fuel line 20 and, in the illustrated instance, a valve stem 22 moves downwardly as viewed in FIG. 1 to open the valve and is internally biased to a closed position, that is, upwardly as viewed in FIG. 1.

A bracket 24 is fixed to valve 21 and provides a fulcrum 25 for a control arm 26 for the valve. The manner in which control arm 26 is acted upon by the safety means of the present invention will be described later herein. As indicated in the preamble hereto a multiple point safety system is provided which operates to close the fuel valve 21 upon any one of various emergency conditions or contingencies.

A pair of telescopically interfitting members 30 and 31 are disposed at the upper end of tee 16, coaxially therewith. The lower telescoping member 31 is threaded into the upper end of tee 16 and the telescoping members 30 and 31 are normally connected by a cylindrical layer of an alloy of a predetermined relatively low melting point. This fusible connection is in the form of a sleeve or bushing and is designated 33 in FIG. 1.

A cylindrical member 35 which is closed at its bottom end threads into the upper end of the upper telescoping member 30 and has a wrench receiving enlargement 36 adjacent to its upper end. The lower end of cylindrical member 35 projects into boiler 10 and is intimately exposed to the heated fluid in the boiler. A fusible element which includes a low melting alloy is designated 38 and may be of any predetermined melting point according to safety requirements of the particular system in which the same is employed.

The lower end of fusible element 38 is anchored with respect to cylindrical member 35 by means of a rod 40 which connects at its lower end with the lower end of element 38 and is detachably connected with the upper end of cylindrical member 35. As shown in FIG. 1, the upper end of anchoring rod 40 is bent at right angles to pass through a perforation in the upper end of cylindrical member 35 and is threaded to receive a nut 41. Heat insulating material 42 may be inserted in the upper end of cylindrical member 35 as shown in FIG. 1.

A thin rod or wire 43 connects with the upper end of fusible element 38 and extends upwardly through cylindrical member 35. The upper end of rod or wire 43 connects with a further fusible element 44 which is located within an extension tube 45 leading from the outlet 13 of safety valve 11. Thus fusible element 44 is exposed to the temperature of fluid issuing from safety valve 11 when the latter opens due to excessive pressure at its inlet 12.

A further thin rod or wire 48 extends upwardly from the upper end of fusible element 44 and in the present instance engages the lower end of an extension coil spring 49 whose upper end is connected to the lower end of another fusible element 50 whose upper end is connected to the outer end of fuel valve control arm 26, as clearly shown in FIG. 1.

The three fusible elements 38, 44 and 50 will each be selected to part at a desired temperature. While varying in their fusion temperatures, all three may be of the general type shown in detail at 74 in FIG. 2 of my co-pending application, Serial No. 281,494, filed May 20, 1963.

Further means are provided for shutting off electrical control valves or other electrical devices in conjunction with the safety system of the present invention or for providing an electrical control for mechanical devices of various kinds which may be employed in conjunction with various heating apparatus with which the present system may be employed. Referring particularly to FIG. 2, a thermal bar or rod 60 is carried at one end by a screw member 61 which threads into the wall of tube 45 and extends substantially across tube 45 so as to be exposed to temperatures prevailing therein, particularly when valve 11 opens under excessive pressure from boiler 10.

A nut 63 may be employed for clamping a junction box 62 to screw member 61. The outer end of rod 60 is bored to receive a so-called solder pot pin 66 of a commercial type thermally responsive switch 69. The thermally responsive switch 69 includes a conventional reset button 70.

It will be noted from the foregoing that the fuel supply valve 21, which is internally biased to closed position, is normally held in open position by a tension rod system comprising primarily the rods or wires designated 43 and 48. The continuity of the valve-opening force thus exerted through lever 26 may be disrupted in the event of any one of four separate abnormal thermal conditions, any of which may occur at any time under a particular set of conditions.

In the first place, the lower end of rod 43 is anchored through the fusible element 38 and the anchoring rod 40, which is fixed to the upper end of cylindrical member 35. It will be seen from this that an abnormal fluid temperature directly within the boiler 10 will fuse the element 38 and release the tension on valve lever 26, whereupon the fuel supply valve 21 will close. Under certain other conditions the temperature of the boiler shell 10 itself may become excessive by conducted heat or otherwise and this temperature will rapidly be conducted through nipple 15, T 16 and telescopinig member 31 to the fusible bushing 33. When the latter melts or softens sufficiently to release, the upward pull of rod 43 which produces a corresponding upward force on anchoring rod 40 will cause the upper telescoping member 30 to release upwardly from the lower telescoping member 31 which again will destroy the tension in the rod system 43, 48 and release valve lever 26 to effect valve closure.

Thirdly, thermal element 44 which connects rod members 43 and 48 is located in tube 45 leading from the outlet side of safety valve 11 so that if the latter opens under excess pressure steam escaping therethrough will fuse element 44 and again result in valve closure. Fourth, if the ambient temperature exceeds a given degree the fusible element 50 will melt and part and again valve lever 26 will be freed and fuel supply valve 21 will close. In this connection it is to be understood that both the rod 48 and spring 49 are partially broken away and that the fuel supply valve 21 and lever 26 may therefore be a substantial distance above the safety valve 11.

Upon the opening of safety valve 11 the thermal rod 60 will conduct heat to the sensitive pin member 66 of thermal switch 69 which will accordingly open and thus interrupt or otherwise effect control of electric structure in connection with the fuel system of the apparatus as indicated previously herein. The thermal switch 69 and fusible element 44 may be calibrated to operate at substantially the same maximum temperature or they may be calibrated to operate in any particular desired sequence.

I claim:

1. In a protective system for fluid heating vessels subject to elevated temperatures and pressures, a tubular member adapted to be fixed at one end to such vessel in fluid communication with the interior thereof, means for controlling the supply of heat energy to said vessel, means biasing said control means to a position for preventing such energy supply, and means for holding in energy supplying position said control means, said last mentioned means comprising tension means extending from within said tubular member to said control means, a tubular well member immersed directly in the fluid in said vessel and disposed coaxially within said tubular member to extend outwardly of said vessel and form with said tubular member and annular fluid passage leading from the interior of said vessel, a conduit extending laterally from said annular passage, a safety valve having its inlet connected to said conduit and having its outlet extending in intersecting relation with said tension means, openings in said outlet to permit free passage of said tension means therethrough, a fusible link in said tension means and disposed in said safety valve outlet, a second fusible link in said tension means adjacent to said control means and spaced substantially from said vessel, and a fusible element in said well member having one end anchored with respect thereto and the other end connected to said tension means.

2. In a protective system for fluid heating vessels subject to elevated temperatures and pressures, a tubular member adapted to be fixed at one end to such vessel in fluid communication with the interior thereof, means for controlling the supply of heat energy to said vessel, means biasing said control means to a position for preventing such energy supply, and means for holding in energy supplying position said control means, said last mentioned means comprising tension means extending from within said tubular member to said control means, a tubular well member immersed directly in the fluid in said vessel and disposed coaxially within said tubular member to extend outwardly of said vessel and form with said tubular member an annular fluid passage leading from the interior of said vessel, a conduit extending laterally from said annular passage, a safety valve having its inlet connected to said conduit and having its outlet extending in intersecting relation with said tension means, openings in said outlet to permit free passage of said tension means therethrough, a fusible link in said tension means and disposed in said safety valve outlet, and a fusible element in said well member having one end anchored with respect thereto and the other end connected to said tension means.

3. In a protective system for fluid heating vessels subject to elevated temperatures and pressures, a tubular member adapted to be fixed at one end to such vessel in fluid communication with the interior thereof, means for controlling the supply of heat energy to said vessel, means biasing said control means to a position for preventing such energy supply, and means for holding in energy supplying position said control means, said last mentioned means comprising tension means extending from within said tubular member to said control means, a tubular well member immersed directly in the fluid in said vessel and disposed coaxially within said tubular member to extend outwardly of said vessel and form with said tubular member an annular fluid passage leading from the interior of said vessel, a rigid fluid tight connection between the outer ends of said tubular member and said tubular well member to seal said annular fluid passage and support said well member, a conduit extending laterally from said annular passage, a safety valve having its inlet connected to said conduit and having its outlet extending in intersecting relation with said tension means, openings in said outlet to permit free passage of said tension means therethrough, a fusible link in said tension means and disposed in said safety valve outlet, a fusible element in said well member having one end anchored with respect thereto and the other end connected to said tension means.

4. In a protective system for fluid heating vessels subject to elevated temperatures and pressures, a tubular member adapted to be fixed at one end to such vessel in fluid communication with the interior thereof, means for controlling the supply of heat energy to said vessel, means biasing said control means to a position for preventing such energy supply, and means for holding in energy supplying position said control means, said last mentioned means comprising tension means extending from within said tubular member to said control means, a tubular well member immersed directly in the fluid in said vessel and disposed coaxially within said tubular member to extend outwardly of said vessel and form with said tubular member an annular fluid passage leading from the interior of said vessel, a rigid fluid tight connection between the outer ends of said tubular member and said tubular well member to seal said annular fluid passage and support said well member, said tubular member having telescoping portions and a layer of fusible material connecting the same whereby when said fusible material melts the tension of said tension means is disrupted by disconnection of said well member and said fluid tight connection from said vessel, a conduit extending laterally from said annular passage, a safety valve having its inlet connected to said conduit and having its outlet extending in intersecting relation with said tension means, openings in said outlet to permit free passage of said tension means therethrough, a fusible link in said tension means and disposed in said safety valve outlet, a fusible element in said well member having one end anchored with respect thereto and the other end connected said tension means.

5. In a protective system for fluid heating vessels subject to elevated temperatures and pressures, a tubular member adapted to be fixed at one end to such vessel in fluid communication with the interior thereof, means for controlling the supply of heat energy to said vessel, means biasing said control means to a position for preventing such energy supply, and means for holding in energy supplying position said control means, said last mentioned means comprising tension means extending from within said tubular member to said control means, a tubular well member immersed directly in the fluid in said vessel and disposed coaxially within said tubular member, and a fusible element in said well member having one end anchored with respect thereto and the other end connected to said tension means, whereby said means for holding said control means is released when said fusible element melts, the outer ends of said tubular member and said tubular well member being releasably connected to support said well member, said tubular member having telescoping portions and a layer of fusible material connecting the same whereby when said fusible material melts the tension of said tension means is disrupted by disconnection of said well from said vessel.

6. In a protective system for fluid heating vessels subject to elevated temperatures and pressures, a tubular member adapted to be fixed at one end to such vessel in fluid communication with the interior thereof, means for controlling the supply of heat energy to said vessel, means biasing said control means to a position for preventing such energy supply, and means for holding in energy supplying position said control means, said last mentioned means comprising tension means extending from within said tubular member to said control means, a tubular well member immersed directly in the fluid in said vessel and disposed coaxially within said tubular member, a fusible link in said tension means spaced substantially from said vessel, and a fusible element in said well member having one end anchored with respect thereto and the other end connected to said tension means, whereby said means for holding said control means is released when said fusible element melts, the outer ends of said tubular member and said tubular well member being releasably connected to support said well member, said tubular member having telescoping portions and a layer of fusible material connecting the same whereby when said fusible material melts the tension of said tension means is disrupted by disconnection of said well from said vessel.

7. In a protective system for fluid heating vessels subject to elevated temperatures and pressures, a tubular member adapted to be fixed at one end to such vessel in fluid communication with the interior thereof, means for controlling the supply of heat energy to said vessel, a tubular well member extending into said vessel from a wall portion thereof, means biasing said control means to a position for preventing such energy supply, and means for holding in energy supplying position said control means, said last mentioned means comprising tension means extending from within said tubular well member to said control means, a safety valve having its inlet connected to said vessel and having its outlet extending in intersecting relation with said tension means, openings in said outlet to permit free passage of said tension means therethrough, a fusible link in said tension means and disposed in said safety valve outlet, a second fusible link in said tension means adjacent to said control means and spaced substantially from said vessel, and a fusible element in said well member having one end anchored with respect thereto and the other end connected to said tension means.

8. In a protective system for fluid heating vessels subject to elevated temperatures and pressures, a tubular member adapted to be fixed at one end to such vessel in fluid communication with the interior thereof, means for controlling the supply of heat energy to said vessel, a tubular well member extending into said vessel from a wall portion thereof, means biasing said control means to a position for preventing such energy supply, and means for holding in energy supplying position said control means, said last mentioned means comprising tension means extending from within said tubular well member to said control means, a safety valve having its inlet connected to said vessel and having its outlet extending in intersecting relation with said tension means, openings in said outlet to permit free passage of said tension means therethrough, a fusible link in said tension means and disposed in said safety valve outlet, and a fusible element in said well member having one end anchored with respect thereto and the other end connected to said tension means.

References Cited by the Examiner

UNITED STATES PATENTS

| 1,691,442 | 11/1928 | Kennell | 137—77 |
| 2,410,900 | 11/1946 | Radbill | 122—504.1 |

FOREIGN PATENTS

| 468,661 | 10/1950 | Canada. |
| 681,458 | 10/1952 | Great Britain. |
| 875,849 | 8/1961 | Great Britain. |
| 880,110 | 10/1961 | Great Britain. |

FREDERICK L. MATTESON, Jr., *Primary Examiner.*

KENNETH W. SPRAGUE, *Examiner.*